(12) United States Patent
Erickson

(10) Patent No.: US 6,584,801 B2
(45) Date of Patent: Jul. 1, 2003

(54) ABSORPTION CYCLE WITH INTEGRATED HEATING SYSTEM

(76) Inventor: Donald C. Erickson, 1704 S. Harbor La., Annapolis, MD (US) 21401

( * ) Notice: Subject to any disclaimer, the term of this patent is extended or adjusted under 35 U.S.C. 154(b) by 17 days.

(21) Appl. No.: 09/734,538

(22) Filed: Dec. 12, 2000

(65) Prior Publication Data

US 2002/0069665 A1 Jun. 13, 2002

(51) Int. Cl.⁷ ............................................... F25B 15/00
(52) U.S. Cl. ............................ 62/476; 62/483; 62/495
(58) Field of Search ......................... 62/476, 483, 495

(56) References Cited

U.S. PATENT DOCUMENTS

| | | | | |
|---|---|---|---|---|
| 4,491,461 A | * | 1/1985 | Hoekstra | 62/17 |
| 4,617,184 A | * | 10/1986 | Brown et al. | 423/579 |
| 4,691,532 A | * | 9/1987 | Reid et al. | 62/476 |
| 4,873,839 A | * | 10/1989 | Dessanti et al. | 62/238.6 |
| 5,077,986 A | * | 1/1992 | Cook et al. | 62/483 |
| 5,097,676 A | * | 3/1992 | Erickson | 62/476 |
| 5,660,049 A | * | 8/1997 | Erickson | 62/107 |
| 5,766,519 A | * | 6/1998 | Erickson | 261/140.2 |
| 5,966,948 A | * | 10/1999 | Anand | 62/101 |

* cited by examiner

*Primary Examiner*—William C. Doerrler
*Assistant Examiner*—Mark Shulman

(57) ABSTRACT

An absorption system powered by low temperature heat for producing at least one of refrigeration and power is disclosed, wherein a low-pressure drop heat reclaimer 1 reclaims heat from the source into a heating agent, which in turn supplies heat to the absorption cycle desorber 5 via internal coils 7. The extra temperature differential normally present in closed cycle heating systems is avoided by using the absorption working fluid as the heating agent, in an integrated system.

12 Claims, 5 Drawing Sheets

ABSORPTION CYCLE WITH INTEGRATED HEATING SYSTEM

CROSS-REFERENCE TO RELATED APPLICATIONS

None

STATEMENT REGARDING FEDERALLY SPONSORED RESEARCH OR DEVELOPMENT

Not applicable

REFERENCE TO A MICROFICHE APPENDIX

Not applicable

BACKGROUND OF THE INVENTION

This invention relates to methods of efficiently applying low temperature heat to absorption refrigeration cycles and absorption power cycles. In conventional absorption cycles, high temperature heat is applied to a high-pressure desorber or generator, where high-pressure vapor is desorbed from the absorbent solution. When the resulting vapor is pure refrigerant, as with LiBr—$H_2O$ absorption cycles, no further treatment is necessary. When the resulting vapor has appreciable absorbent content, as with $NH_3$—$H_2O$ absorption cycles, it is necessary to distill, analyze, or rectify the vapor to higher refrigerant purity by contacting it with lower temperature absorbent. That distillation may be done either adiabatically or diabatically. The external heat addition portion of the desorber is customarily termed the generator, and the distillation portion may have internal heat addition.

When the external heat source is at relatively low temperature, for example only modestly above the generator temperature, and when it has a temperature glide, then very little of the heat content of the source can be effectively transferred to the generator using conventional techniques. Consider for example a combustion exhaust stream at 270° C., and an absorption cycle generator at 170° C. Given a 30° C. minimum temperature difference for heat transfer, it is only possible to cool the heat source from 270° C. to 200° C. by transferring heat to the generator. This is only on the order of 30% of the available heat content of that source.

Two other possible problems arise when supplying low temperature waste heat such as combustion exhaust gas to an absorption cycle. With one approach, the combustion exhaust directly contacts the heat transfer surface of the generator. However, there are usually stringent limitations on the allowable pressure drop of the exhaust gas. For example, the backpressure for a combustion turbine is typically specified at no more than six to ten inches water column. The generator which satisfies both this criterion and also the specialized mass transfer criteria of the absorbent solution will be very large and costly. That is, the transfer geometry necessary for effective desorption is very different from that necessary for low $\Delta p$ extraction of heat from combustion gas. Alternatively a closed cycle heat transfer fluid can be circulated between the heat source and the generator, such that the geometry of each heat exchanger is free to be optimized for the respective requirements. This has the disadvantage that two separate heat exchanger temperature differentials are interposed between the waste heat and the absorbent solution in the generator. For example, the heat transfer fluid must be heated to well above the generator peak temperature. If water is the heat transfer fluid, it will have to be at a much higher pressure than the generator.

There are a variety of hydrocarbon-fueled prime movers which exhaust a combustion gas, including gas turbines, microturbines, reciprocating engines, and fuel cells. Depending upon the prime mover, the exhaust temperature varies from 200° C. to 550° C. There is increasing need and desire to convert that exhaust heat to useful purpose, such as cooling, refrigeration, shaft power, or electricity. It is one objective of the present invention to convert greater fractions of waste heat to useful purpose than has heretofore been possible. It is another objective to avoid the prior art disadvantages of applying waste heat to absorption cycles, i.e., the high backpressure associated with direct contact heat transfer, and the high temperature differentials associated with pump-around loops. That is, there is a need for a method of transferring heat from a low temperature sensible heat source to an absorption cycle which avoids the $\Delta p$ and $\Delta T$ and high pressure penalties associated with traditional methods, while achieving greater utilization of the heat source, i.e., more useful result.

BRIEF SUMMARY OF THE INVENTION

The above and other useful objects are achieved by apparatus wherein thermal energy is converted into at least one of refrigeration, cooling, and shaft power comprising:
a) an absorbent solution comprised of sorbate plus absorbent;
b) a desorber comprised of:
  i) an entry port for sorbate-rich liquid absorbent;
  ii) a means for separating said sorbate-rich absorbent into sorbate vapor and sorbate-lean absorbent;
  iii) an exit port for said sorbate vapor; and
  iv) an internal heat exchanger which has an entry port in communication with said sorbate-lean absorbent;
c) an external heat exchanger which is in thermal contact with said thermal energy;
d) a first flowpath from an exit port of said internal heat exchanger to said external heat exchanger; and
e) a second flowpath from said external heat exchanger to said desorber;

and also by process comprising:
a) circulating an absorbent solution successively through absorbing and desorbing steps;
b) desorbing the absorbent solution into high-pressure sorbate vapor and heated strong absorbent by heating it;
c) using the heated strong absorbent as the heating agent in step b);
d) reheating said heating agent by thermally contacting it with said thermal energy; and
e) combining said reheated heating agent with said heated strong absorbent.

The greater utilization of the thermal energy in the waste heat or other low temperature heat source is accomplished by applying it to a heat transfer agent, and then applying the heat transfer agent heat to at least part of a distillation step, (when present) which is at lower temperature, and/or by applying it to an intermediate-pressure desorber which is at lower temperature. Either or both of these steps further reduce the heat transfer agent temperature to below the high-pressure generator temperature, and in turn make it possible to reclaim lower temperature heat from the heat source. With this technique, the heat transfer agent can be routinely cooled to approximately 80° C. or lower, which means the combustion gas can be cooled to approximately 100° C. or lower.

DETAILED DESCRIPTION OF THE INVENTION

Figure 1:
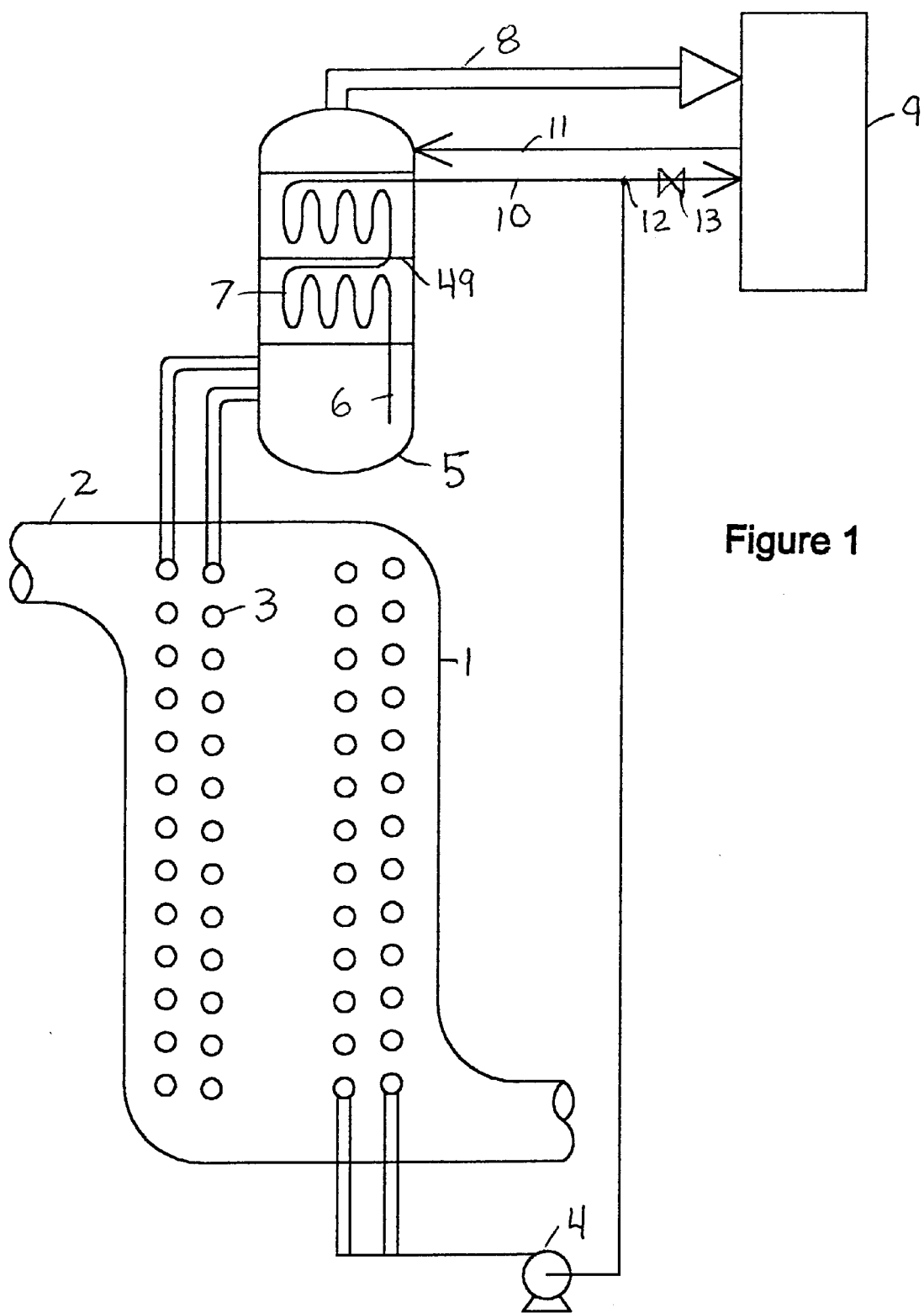
FIG. 1 depicts one embodiment of the integrated heating system constituent parts and their arrangement.

Referring to FIG. 1, a low temperature sensible heat stream such as combustion exhaust gas is supplied to heat reclaimer 1 through inlet 2, where it contacts the external heat exchanger 3. Pump 4 circulates a heat transfer fluid through heat exchanger 3, in direction overall counter-current to the flow direction of the exhaust gas. By having the heat reclaimer 1 vertically oriented as shown, any condensate formed on the cooler bottom coils drains away, and also the coils can be adapted to be self-draining should pump 4 fail, thus preventing over-pressurization. The heated heat transfer fluid exits reclaimer 1 preferably as a two-phase mixture and is routed to desorber 5, where phase separation occurs. The resulting liquid phase comprised of both liquid from the reclaimer and also sorbate-lean absorbent solution (i.e. "weak" absorbent) from the remainder of the desorber, is routed through pipe 6 into internal heat exchanger 7 which supplies heat to colder portions of the desorber, for example, by means of a succession of vertically stacked diabatic trays 49. The hot vapor also traverses up through the desorber, on the other side of internal heat exchanger 7. The purified vapor exits the generator through pipe 8 and is routed to the remainder portion of the absorption cycle 9. The heat transfer fluid exits the internal heat exchanger 7 and desorber 5 through pipe 10, and is split at splitter 12, with part going via pressure letdown valve 13 to the absorption step in portion 9, and the remainder to pump 4 for recycle to reclaimer 1. The high-pressure vapor from pipe 8 is converted in portion 9 to a low-pressure vapor, via a condenser and evaporator so as to produce cooling, and/or via a work expander to produce shaft power. The resulting low-pressure vapor and absorbent from pipe 10 are subsequently recombined in portion 9 and pumped back to the entry port for sorbate-rich absorbent of desorber 5 via pipe 11. The heat exchanger in reclaimer 1 can be comprised of concentric tube coils, pancake tube coils, or any other known geometry, e.g., fin tubes, folded plates, or others such as those used for steam cycle economizers. Particularly pertinent are the steaming type of economizers which ordinarily produce a two-phase mixture. With ammonia-water cycles, the heat transfer fluid will usually be nearly pure water, and the pressure will be essentially the generator pressure, since the two fluids combine at the generator. With $LiBr$—$H_2O$ absorption cycles, the circulating heat transfer fluid will be concentrated LiBr solution.

By integrating the heat transfer fluid directly into the absorption cycle, the advantage is retained that the reclaimer can be optimized for the necessary low pressure drop, and yet there is no additional temperature differential penalty because the heating fluid temperature never increases to appreciably above the hottest generator temperature. Since most of the heating duty in the heat reclaimer is sensible heating of the heating agent, the temperature difference between the heating agent and the combustion exhaust can be relatively constant, resulting in highly efficient heat exchange, i.e., avoiding the pinch temperature associated with constant temperature boilers.

Figure 2:
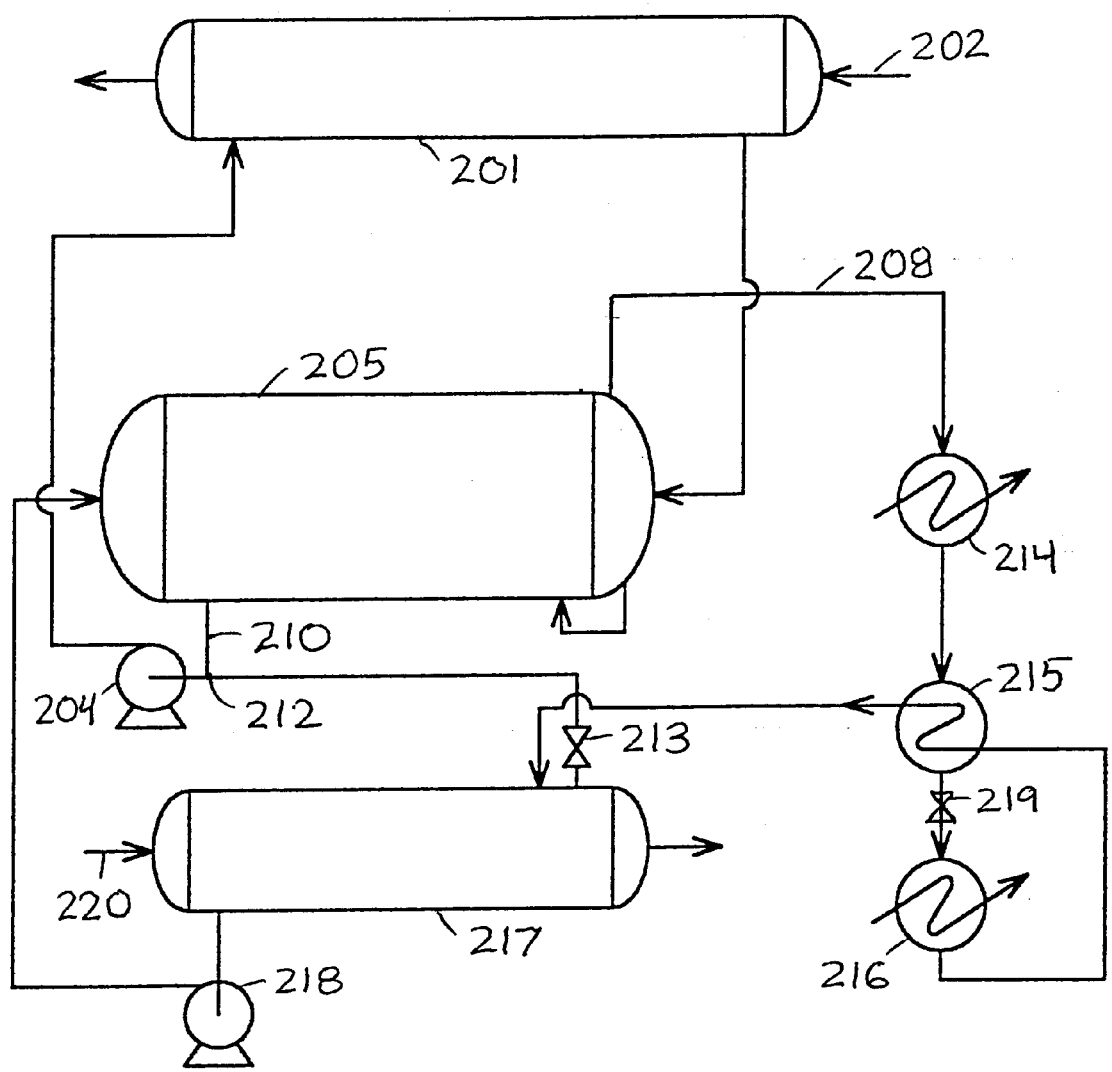
FIG. 2 depicts a two-pressure single-effect absorption cycle with co-current mass exchangers which produces cooling from low temperature waste heat using the integrated heating system.

In FIG. 2 and succeeding figures, objects with similar descriptions are afforded the same number in each sequence, e.g., object 201 of FIG. 2 is described similarly as object 101 of FIG. 1.

Referring to FIG. 2, low temperature sensible heat is supplied to heat reclaimer 201 via entry port 202. Pump 204 circulates heat transfer agent through reclaimer 201 counter-currently to the exhaust flow direction. Two-phase heat transfer agent is then routed to the hot end of generator 205 (also called a desorber). Vapor is withdrawn via pipe 208, and hot liquid is supplied to an internal heat exchanger in generator 205 via pipe 206. That liquid exits at pipe 210, is split at splitter 212, with part being recycled via pump 204, and the remainder supplied to low-pressure absorber 217 via pressure letdown valve 213. High-pressure vapor in pipe 208 is condensed in condenser 214, subcooled in subcooler 215, reduced in pressure in pressure letdown 219, and evaporated in evaporator 216. The resulting low-pressure vapor is absorber into sorbate-lean ("strong") absorbent 217, which is cooled by coolant 220, and the resulting sorbate-rich ("weak") absorbent is pumped by pump 218 back to desorber 205. The various exchanges may be shell and tube, coil in shell, or other known types.

Figure 3:
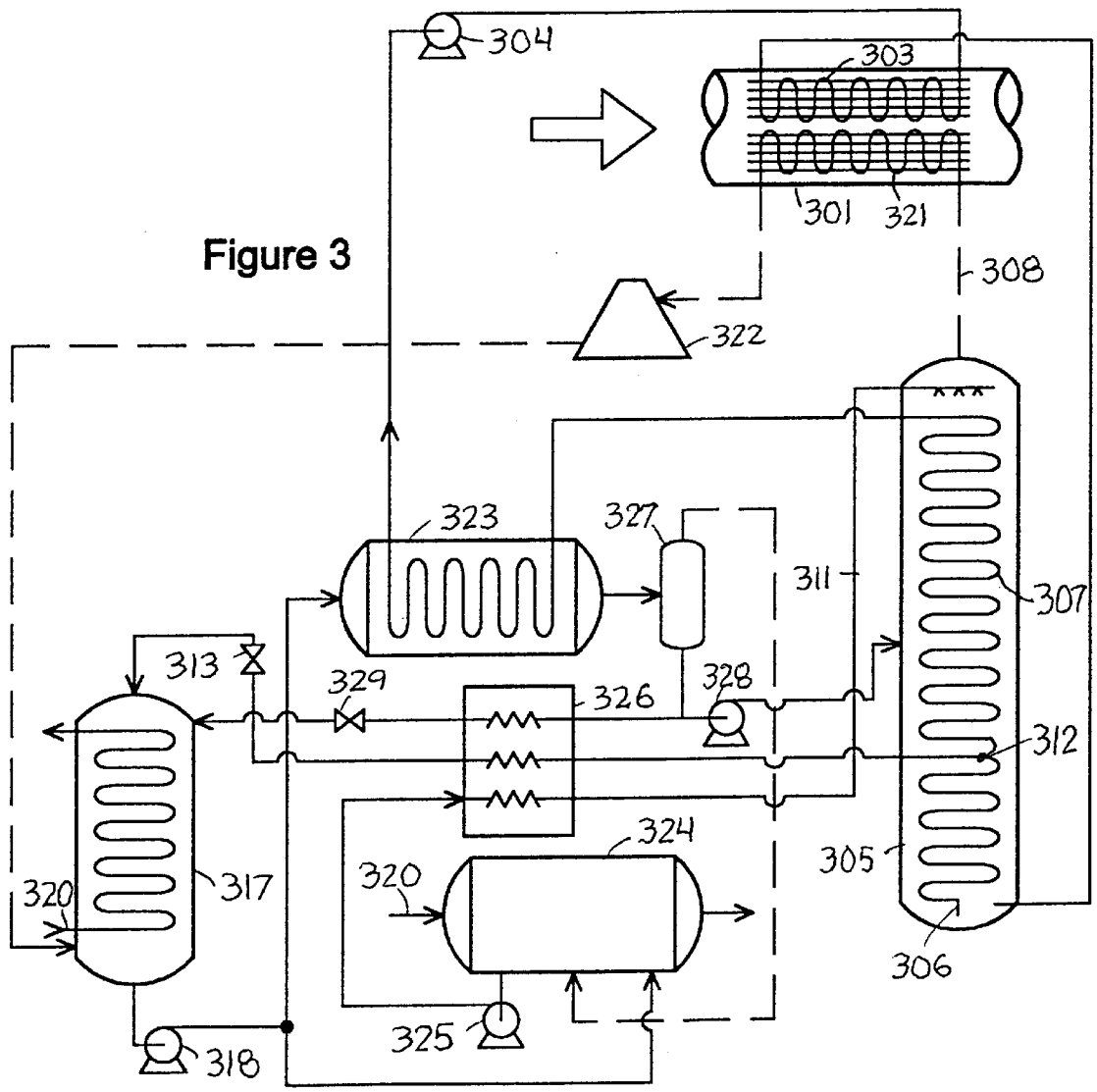
FIG. 3 depicts a three-pressure absorption cycle for a volatile absorbent such as $NH_3$—$H_2O$ which is adapted to produce shaft power from waste heat using an integrated heating system.

Referring to FIG. 3, waste heat enters reclaimer 301 through entry port 302. Heat transfer fluid is counter-currently circulated through steaming economizer 303 via pump 304, and thence to the bottom of desorber column 305, where phase separation occurs. The liquid phase enters internal heating coils 307 via inlet pipe 306. Part of the llliquid phase is split off at splitter 312 and routed to pressure letdown 313 via solution heat exchanger 326. The remainder heats the colder top end of column 305, then supplies lower temperature heat to intermediate pressure desorber 323, and then is recycled by pump 304. Desorber vapor in pipe 308 is superheated in superheater 321 by counter-current heat exchange with the source heat, in parallel with exchanger 303. Then the superheated vapor is work-expanded in expander 322. The resulting low-pressure vapor is absorbed in low-pressure absorber 317 into the strong absorbent from letdown 313, while absorption heat is removed By integrating the heat transfer fluid directly into the absorption cycle, the advantage is retained that the reclaimer can be optimized for the necessary low pressure drop, and yet there is no additional temperature differential penalty because the heating fluid temperature never increases to appreciably above the hottest generator temperature. Since most of the heating duty in the heat reclaimer is sensible heating of the heating agent, the temperature difference between the heating agent and the combustion exhaust can be relatively constant, resulting in highly efficient heat exchange, i.e., avoiding the pinch temperature associated with constant temperature boilers.

In FIG. 2 and succeeding figures, objects with similar descriptions are afforded the same number in each sequence, e.g., object 201 of FIG. 2 is described similarly as object 101 of FIG. 1.

Referring to FIG. 2, low temperature sensible heat is supplied to heat reclaimer 201 via entry port 202. Pump 204 circulates heat transfer agent through reclaimer 201 countercurrently to the exhaust flow direction. Two-phase heat transfer agent is then routed to the hot end of generator 205 (also called a desorber). Vapor is withdrawn via pipe 208, and hot liquid is supplied to an internal heat exchanger in generator 205 via pipe 206. That liquid exits at pipe 210, is split at splitter 212, with part being recycled via pump 204, and the remainder supplied to low-pressure absorber 217 via pressure letdown valve 213. High-pressure vapor in pipe 208 is condensed in condenser 214, subcooled in subcooler 215, reduced in pressure in pressure letdown 219, and evaporated in evaporator 216. The resulting low-pressure vapor is absorber into sorbate-lean ("strong") absorbent 217, which is cooled by coolant 220, and the resulting sorbate-rich ("weak") absorbent is pumped by pump 218 back to desorber 205. The various exchanges may be shell and tube, coil in shell, or other known types.

Referring to FIG. 3, waste heat enters reclaimer 301 through entry port 302. Heat transfer fluid is counter-currently circulated through steaming economizer 303 via pump 304, and thence to the bottom of desorber column 305, where phase separation occurs. The liquid phase enters internal heating coils 307 via inlet pipe 306. Part of the IIliquid phase is split off at splitter 312 and routed to pressure letdown 313 via solution heat exchanger 326. The remainder heats the colder top end of column 305, then supplies lower temperature heat to intermediate pressure desorber 323, and then is recycled by pump 304. Desorber vapor in pipe 308 is superheated in superheater 321 by counter-current heat exchange with the source heat, in parallel with exchanger 303. Then the superheated vapor is work-expanded in expander 322. The resulting low-pressure vapor is absorbed in low-pressure absorber 317 into the strong absorbent from letdown 313, while absorption heat is removed by cooling heat transfer stream 320. The resulting absorbent is pumped to intermediate-pressure in pump 318, then split into a feed to intermediate-pressure desorber 323 and to intermediate-pressure absorber 324. Vapor from intermediate-pressure desorber 323 is separated at separator 327 and then absorbed in intermediate-pressure absorber 324. Pump 325 pumps the resulting weak absorbent back to high pressure for re-entry into column 307. The FIG. 3 cycle incorporates both counter-current mass exchange columns (305 and 317) and co-current mass exchangers (323 and 324). Branch pump 328 improves the linearity of the temperature glide in column 307.

Figure 4:
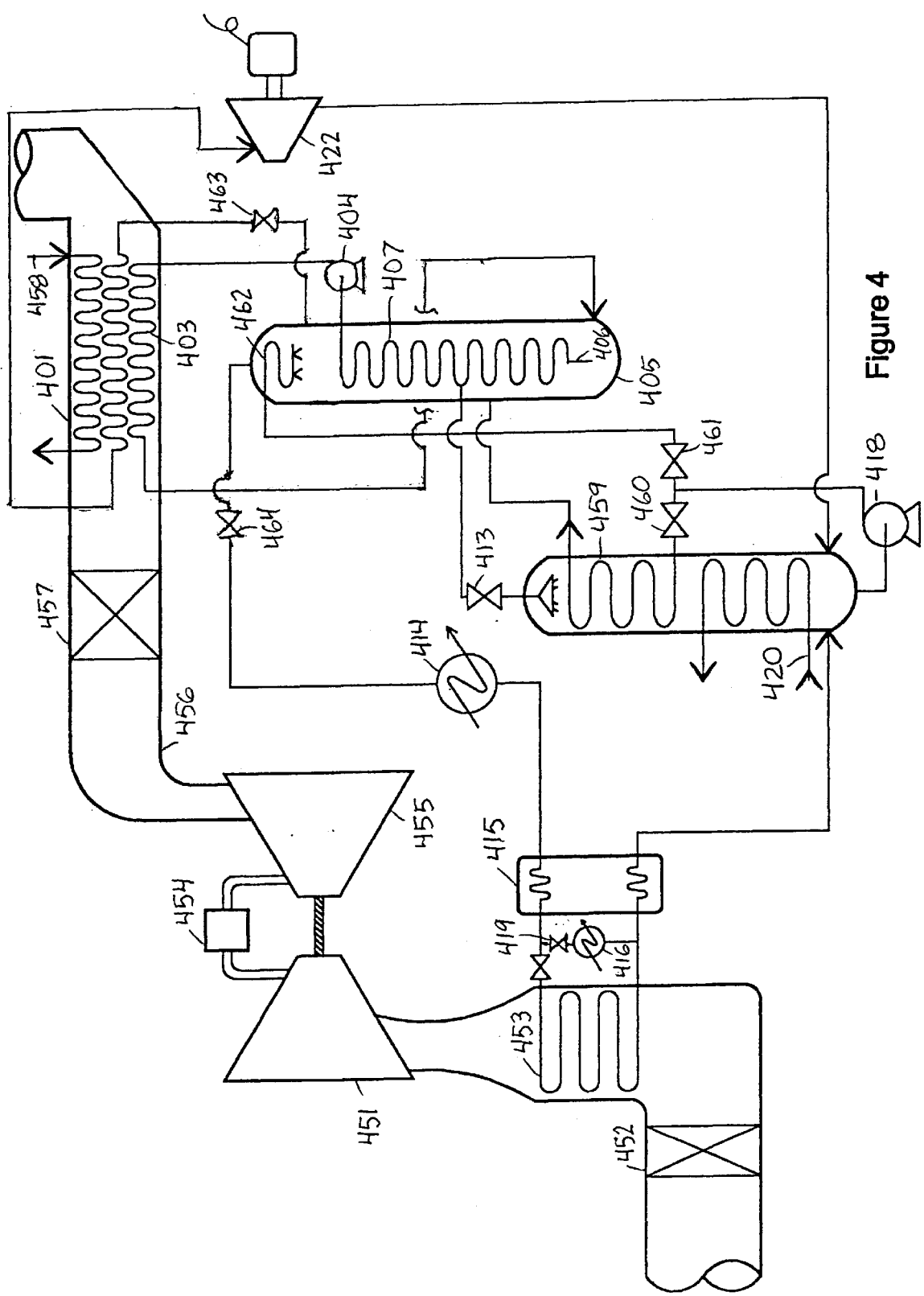
FIG. 4 depicts a two-pressure absorption cycle adapted to produce both power and cooling from combustion turbine exhaust via an integrated heating system.

Referring to FIG. 4, a two-pressure absorption cycle for a volatile absorbent such as aqua ammonia is depicted, adapted to be powered by combustion turbine waste heat, and further adapted to co-produce both shaft power and also refrigeration, for cooling the turbine inlet air or other cooling loads. Air compressor 451 is supplied air through filter 452 and cooling coil 453. The compressed air supports combustion in combustor 454, and the resulting hot pressurized combustion gas is work-expanded in turbine 455. The combustion exhaust is ducted through exhaust duct 456 to optional heat recovery steam generator (HRSG) 457, and thence to heat reclaiming section 401, comprised of heating agent heater 403, superheater 421, and HRSG economizer 458. The heating agent is supplied to the sump of column 405 where it phase separates. The liquid fraction enters internal exchanger 407 through entry port 406, and part is split off at splitter 412, and sent to letdown valve 413, thence to low-pressure absorber column 417. Low-pressure vapor from turbine 422, evaporator 416, and inlet cooler 453 is absorbed in low-pressure absorber 417, with the colder portion of the heat of absorption removed by cooling stream 420, and the warmer portion by high-pressure GAX (generator absorber heat eXchange) desorption coil 459, from which the two-phase mixture is routed to a mid-height of column 405. Part of the pumped weak absorbent from pump 418 is routed to GAX coil 459, through split control valve 460, and the remainder is routed through split controller 461 to solution-cooled rectifier 462, and then sprayed into the top portion of column 405. Pump 404 circulates the heating agent. The vapor split between turbine 422 and coolers 416 and 453 is controlled by valves 463 and 464, respectively. As shown, those two vapors can be of differing purity, governed by the height of column 405 from which they are withdrawn. It is desirable to send quite high purity vapor to condenser 414, for example at least 95% purity ammonia.

Figure 5:
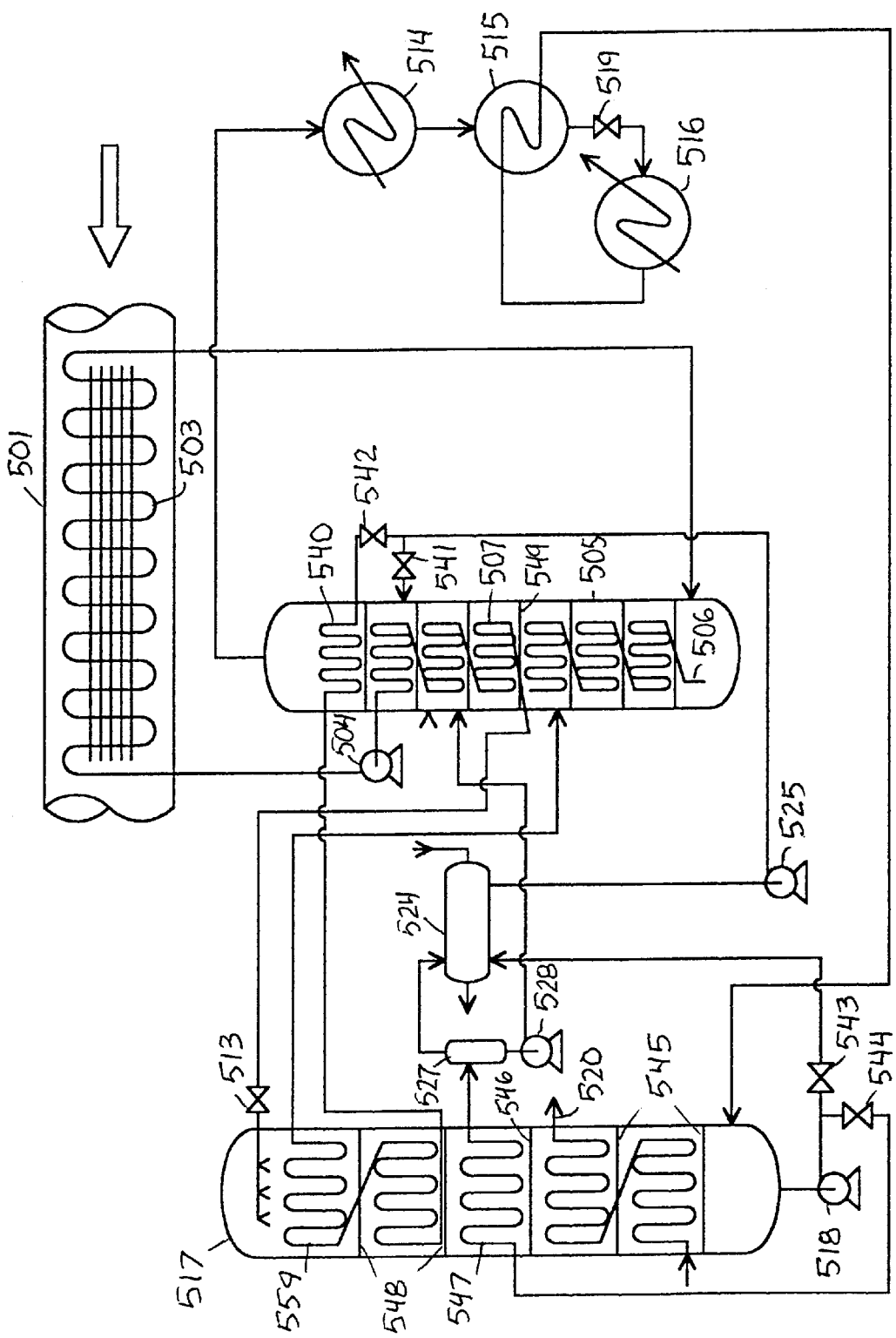
FIG. 5 depicts a three-pressure absorption refrigeration cycle powered by low temperature heat via an integrated heating system.

Referring to FIG. 5, low temperature heat supplied to reclaimer 501 heats heating agent in fin coils 503. Then the two-phase heating agent is routed to the sump region of desorption column 505, where the phases separate. The liquid phase enters entry port 506 of internal heat exchanger 507, a succession of coils on vertically stacked vapor-liquid contact trays 549. High-pressure vapor from column 505 is condensed in condenser 514, subcooled in subcooler 515, expanded in pressure letdown 519, and evaporated in evaporator 516, thus producing refrigeration and low-pressure vapor. That vapor is absorbed into the strong absorbent from splitter 512 and pressure letdown 513, in low-pressure absorber column 517. Column 517 has three sets of cooling coils, in top to bottom (hot to cold) order: High-pressure GAX desorption coil 559 (shown as occupying two trays 548); intermediate-pressure GAX desorption coil 547, (shown as a occupying single tray 546); and the bottom coils for external cooling agent 520, shown as occupying two trays 545. The absorbent from low-pressure absorber 517 is pumped to intermediate-pressure by pump 518, then split by valves 544 and 543 into feeds to an intermediate pressure GAX absorber 547 and the intermediate-pressure absorber 524. The weak absorbent (water with high ammonia content) from intermediate-pressure absorber 524 is pumped to high pressure by pump 525, and split into two streams by valves 542 and 541; the former stream being supplied sequentially to solution-cooled rectifier coil 540 and then to high-pressure GAX desorber coil 559, and finally to column 505 as two-phase; and the latter directly injected into column 505. Branch pump 528 supplies a mid-height of column 505, thereby providing a more linear temperature glide in that column.

The three pressure cycles have similarity to prior art disclosures such as U.S. Pat. No. 5,097,676. The diabatic counter-current columns such as the desorber (distillation column) and low-pressure absorber (reverse distillation column) may be any known geometry. One preferred geometry is the diabatic multi-tray design with contact coils, such as disclosed in U.S. Pat. No. 5,798,086. Particularly preferred are those diabatic trays with same-direction liquid flow and minimal vapor mixing, as disclosed in International Publication No. WO 00/10696, dated Mar. 2, 2000.

I claim:

1. An apparatus for converting thermal energy into at least one of refrigeration, cooling, and shaft power, comprising:
   a) an absorbent solution comprised of sorbate plus absorbent;
   b) a desorber comprised of:
      i) an entry port for sorbate-rich liquid absorbent;
      ii) a means for separating said sorbate-rich absorbent into sorbate vapor and sorbate-lean absorbent;
      iii) an exit port for said sorbate vapor; and iv) an internal heat exchanger which has an entry port in communication with said sorbate-lean absorbent;

c) an external heat exchanger which is in thermal contact with said thermal energy;

d) a first flowpath from an exit port of said internal heat exchanger to said external heat exchanger; and e) a second flowpath from said external heat exchanger to said desorber.

2. The apparatus according to claim 1 additionally comprised of a first absorber plus a flowpath for sorbate-lean liquid from said internal heat exchanger to said absorber.

3. The apparatus according to claim 1 additionally comprised of a pump in said first flowpath.

4. The apparatus according to claim 2 additionally comprised of a second absorber at higher pressure than said first absorber, plus a flowpath for absorbent from said second absorber to said desorber entry port for sorbate-rich absorbent.

5. The apparatus according to claim 4 additionally comprised of a second desorber which supplies vapor to said second absorber.

6. The apparatus according to claim 5 wherein said second desorber is in said first flowpath.

7. The apparatus according to claim 5 wherein said second desorber is in thermal contact with at least part of said first absorber.

8. The apparatus according to claim 3 wherein said desorber is adapted for co-current desorption of sorbate from absorbent.

9. The apparatus according to claim 3 wherein said desorber is adapted for counter-current desorption of sorbate from absorbent.

10. The apparatus according to claim 3 wherein said desorber is additionally comprised of vapor-liquid contact trays, and said internal heat exchanger is comprised of heat exchange coils on said trays.

11. The apparatus according to claim 2 additionally comprised of a condenser for at least part of said sorbate vapor, and an evaporator which receives liquid condensate from said condenser.

12. The apparatus according to claim 2 additionally comprised of a superheater for at least part of said sorbate vapor, and a work-expander for said superheated vapor.

* * * * *